United States Patent [19]

Niki

[11] Patent Number: 5,107,454
[45] Date of Patent: Apr. 21, 1992

[54] PATTERN ASSOCIATIVE MEMORY SYSTEM

[75] Inventor: Kazuhisa Niki, Tsukuba, Japan

[73] Assignee: Agency of Industrial Science and Technology, Tokyo, Japan

[21] Appl. No.: 394,062

[22] Filed: Aug. 14, 1989

[30] Foreign Application Priority Data

Aug. 15, 1988 [JP] Japan .................. 63-202976
Aug. 8, 1989 [JP] Japan .................. 1-205462

[51] Int. Cl.$^5$ .............................. G06F 15/18
[52] U.S. Cl. ...................... 395/24; 371/30; 395/11
[58] Field of Search ............... 364/807, 513; 371/30

[56] References Cited

U.S. PATENT DOCUMENTS 4,660,166  4/1987  Hopfield .................. 364/807
4,719,591  1/1988  Hopfield et al. .......... 364/807
4,912,649  3/1990  Wood .................... 364/200 X
4,941,122  7/1990  Weideman ............... 364/807
4,972,363  11/1990 Nguyen et al. ........... 364/148 X Primary Examiner—Jerry Smith
Assistant Examiner—Allen M. Lo
Attorney, Agent, or Firm—Sterne, Kessler, Goldstein & Fox

[57] ABSTRACT

In a pattern associative memory system, an error correcting circuit is constructed in the form of a neural network. A memory condition of the error correcting circuit is established according to a back propagation method. If a memory pattern is recollected, an output from the error correcting circuit is again inputted to the error correcting circuit for feedback, thereby repeatedly performing error correction calculations of a pattern as the basis of recollection.

8 Claims, 13 Drawing Sheets

107 IMAGE PATTERN

108 CHARACTER

```
.*#.          ###*          ###‡          ####
*  ..         #             #             #
***#.  smy → **##   si¦ →  ####   six →  ####   six
*.  **        *  ..         *  .‡         #    #
**#           **#           ##            ###
```

| IMAGE PATTERN | 1st CYCLE | 2nd CYCLE | 3rd CYCLE |

FIG.6

PATTERN ASSOCIATIVE MEMORY SYSTEM

BACKGROUND OF THE INVENTION

1. FIELD OF THE INVENTION

The present invention relates to a pattern associative memory system which stores learning patterns and associates one pattern, which is most similar to an input pattern, out of the stored learning patterns in a process for recognizing pattern information such as voice and an image, and more particularly to a pattern associative memory system which is suitable for associating pattern information including vagueness or a pattern formed under the conditions in which vagueness is liable to cause cross talk errors.

2. DESCRIPTION OF THE PRIOR ART

As such pattern associative memory methods, there has been known a series of associative memory methods developed by T. Kohonen. In this regard see T. Kohonen, "Self-organization and associative memory" Springer-Verlag (1984), pp. 162-167. Moreover, other pattern associative memory methods developed by K. Nakano and by S. Omari, see K. Nakano, "Association— A Model of Associative Memory", IEEE TRANSACTION ON SYSTEMS, MAN, AND CYBERNETICS, Vol. SMC-2, No. 3, Jul. 1972, pp. 380-388.

A correlation type associative memory method known as the most basic pattern associative memory method will hereunder be explained. A basic feature of the function for associating in this associative memory method is to adjust the transfer efficiency of wirings for transmitting signals in processes from an input of a pattern signal to be associated with to an output of the identified pattern signal by a correlation learning. In such a correlation type memory method, the kinds and number of patterns which may be previously learned and stored (or memorized) as learning pattern are limited. For instance, if the dimension of an input pattern to be identified is n, patterns which are capable of being learned and stored are limited to not more than n linearly independent patterns. Moreover, if there is some vagueness in an input pattern to be associated with, for instance, in the case where a part of the input pattern is lost or an error signal is mixed into the input signal to be associated with, it is known that cross talk errors are caused in an associative memory system.

There has been known an orthogonal learning type memory method as another basic associative memory method. The orthogonal learning type associative memory method is one in which a fault of the correlation type associative memory method is improved by orthogonalizing input patterns. This method is designed so that linearly independent patterns of not more than n can be learned and stored. But, the more incompleteness in the input pattern, the greater the cross talk errors will be.

As has been described above, in both the correlation type and orthogonal learning type memory methods, the auto-associative function does not work if incompleteness of the input pattern increases. In other words, there is a limit in the ability of removing noises and, therefore, in these methods the complete pattern associative memory is performed only when such incompleteness of the input pattern is low. The foregoing method has been adopted at least in one known system having a feedback loop, wherein a recollected output signal is fed back as an input signal,. But, such a feedback processing is not always effective for removing noise.

In addition to these methods, there have also been known, for instance, Hopfield and Boltzmann type associative memory methods which differ from the foregoing methods in constructions and principles. In these methods, the quantity of calculation for associative memory is too great and a associated result can possibly converge to a pattern other than the aforesaid learned and memorized patterns. For this reason, it is very difficult to design a practically useful system.

As has been mentioned above, in the conventional pattern associative memory methods, the ability of learning and storing patterns is insufficient and, hence, it is difficult to discriminate and learn similar learning patterns. In particular, they cannot perform a difficult learning, such as the learning of whole-part pattern in which one learning pattern is completely included in another. In addition, the conventional pattern associative memory methods have a poor ability of association and cannot process inputs having low output activity such as zero input. When there is incompleteness in input patterns, or in other words, a partial deficiency of input or an error mixed in an input, the conventional associative memory system causes cross talk errors. As a result, the conventional associative memory system associates a pattern other than patterns previously learned and memorized, and a severe problem normally arises in that the associating function of the system never works.

FIG. 13 shows an example of the results of an association obtained according to a most basic pattern associative memory method which is conventionally known. In this figure, $x_1$ and $x_2$ each represent an input element, while and $y_1$ and $y_2$ each represent an output element. If each of these two activity values of input signals represent either "0" or "1", there are four input patterns for $(x_1, x_2)$, i.e., (0, 0), (1, 0), (0, 1) and (1, 1). Among these four input patterns, the maximum number of combinations of input patterns capable of being learned is only two, for instance, patterns (1, 0) and (0, 1). FIG. 13 shows a variation from input values indicated by inputted signals to be associated with output values after making the correlation type memory system learn these two input patterns. In addition, the results shown in this figure also indicate that the input signal shifts towards the pattern (0, 0) or (1, 1) which is not learned by the system. In other words, in the correlation type associative memory method, only a part of the input patterns to be associated is correctly converted into a learned pattern and is then outputted, while the other part thereof is converted into patterns differing from the learned patterns and is then outputted. For this reason, it is quite clear that the correlation type associative memory method performs a complete association from an incomplete input only with great difficulty.

SUMMARY OF THE INVENTION

Accordingly, it is an object of the present invention to provide a pattern associative memory method which can learn many more patterns compared with the conventional methods and which can convert an input pattern into a learned and stored pattern even if the input pattern is incomplete.

It is another object of the present invention to provide a pattern associative memory system which makes it possible to reduce the effort for operation on the port of an operator.

According to the first aspect of the present invention, an associative error correcting circuit is constructed in the form of a neural network and further an output signal from the error correcting circuit in which patterns of recollected results are previously stored is transmitted to an input thereof for a feedback of the output signal. Consequently, as a characteristic feature of the correcting circuit having a neural network structure, the correcting circuit corrects a level of the input pattern signal by a desired quantity so as to bring it close to a pattern signal most similar to a pattern signal among the previously stored patterns when the input pattern signal as a source of the recollection is inputted. The level of the input pattern signal is finally converted into one pattern previously stored by the feedback processing performed by the error correcting circuit, the precision of the recollection processing becomes high compared with that achieved by the conventional methods.

According to the second aspect of the present invention, in addition to the first aspect of the present invention the bias of the signal level converting characteristics of the output elements is variably adjusted, so that it is possible to completely coincide the level of the input signal with that of the output signal when the pattern signals are stored, and then an accuracy of a pattern signal for storing in the error correcting circuit can be enhanced.

In the third aspect of the present invention, because the self-association type error correcting circuit having a neural network structure is provided with feedback signal lines, if pattern signal serving as the source of the recollection is once inputted to the error correcting circuit, error correction processing is repeatedly performed in the error correcting circuit. Consequently, an output signal from the error correcting circuit converges to a pattern signal approximately identical with the pattern signal previously stored therein.

According to the fourth aspect of the present invention, the means for correcting errors is designed to have a multi-layered structure, so that it is possible to coincide the input signal with the output signal with a high accuracy.

According to the fifth aspect of the present invention, in addition to the third aspect of the present invention, depending on the kind of the mode, i.e., learning and storing mode and recollection mode, pattern signals to be learned, pattern signals serving as the source of the recollection and output signals from the error correcting circuit are automatically selected and inputted into a signal line switching means the error correcting circuit by signal line switching means. Therefore, the operator can simply carry out mode indication by indicating means and hence an effort of the operator is greatly reduced.

According to the sixth aspect of the present invention, in addition to the third aspect of the present invention, memory conditions establishing means for automatically establishing memory conditions of pattern signal of the error correcting circuit is provided, therefore, an operation by an operator for giving the memory conditions into the error correcting circuit, can be omitted.

According to the seventh aspect of the present invention, in a trial and error processing for establishing the memory conditions of the pattern signal by correction, a value to be corrected is determined according to a back propagation method. Therefore, the time which requires for calculation processing till the transfer efficiency is adjusted, can be shorter than the time which requires for establishing in the case that the transfer efficiency is corrected by a constant correcting value.

According to the eighth aspect of the present invention, taking into consideration the fact that when a level of the output signal converges, the level is not changed a level of the output signal from the error correcting circuit is monitored by a judging means, and the completion of the recollection processing is displayed by a display means. Therefore, the operator by himself must not monitor the level value of the output signal.

The above and other objects, effects, features and advantages of the present invention will become more apparent from the following description of embodiment thereof taken in conjunction with the accompanying drawings.

BRIEF DESCRIPTION OF THE DRAWINGS

FIG. 6 is an explanatory diagram illustrating changes of associated results which are obtained about character patterns in the first embodiment of the present invention;

Figure 7:
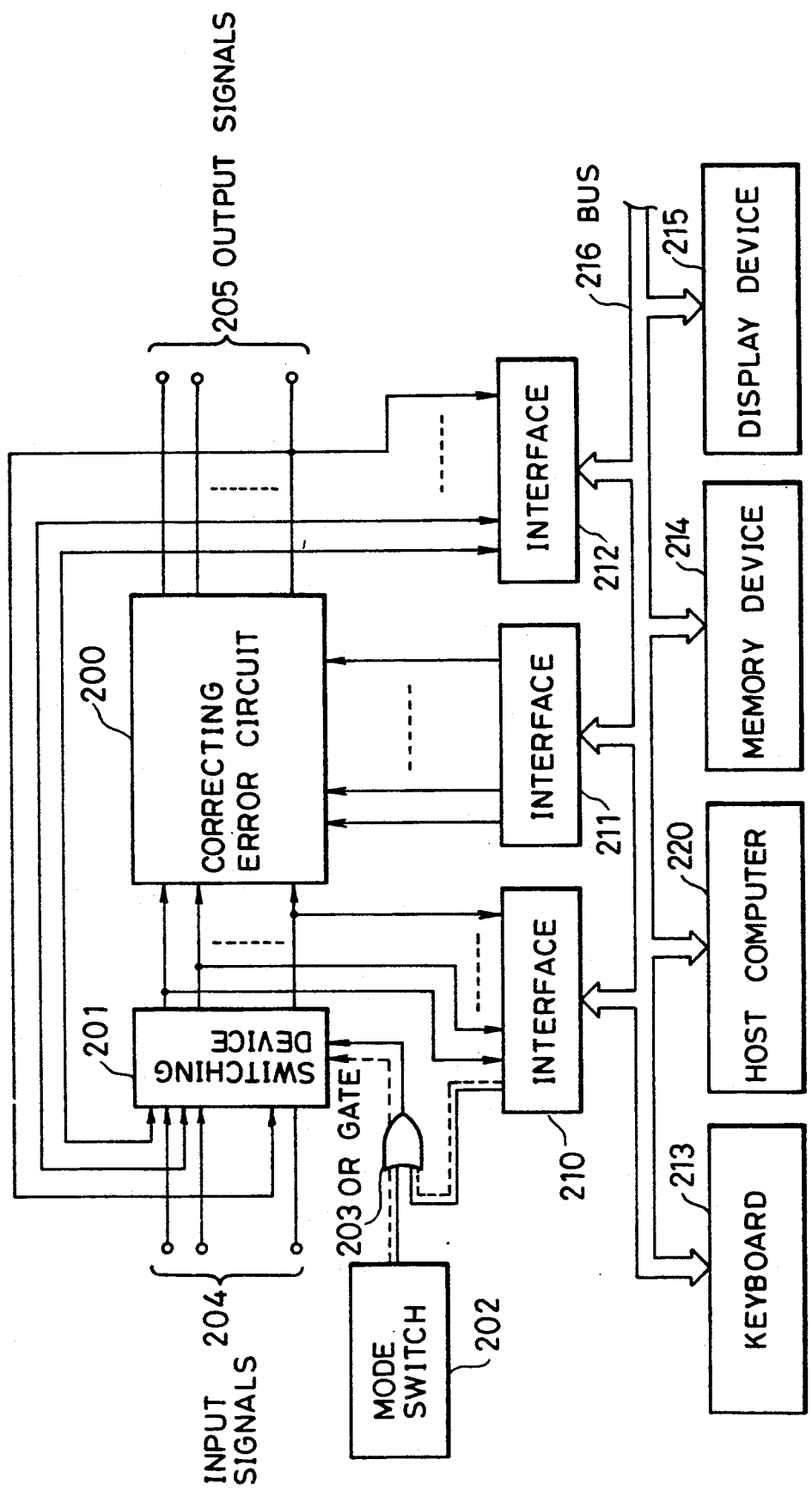
Figure 8:
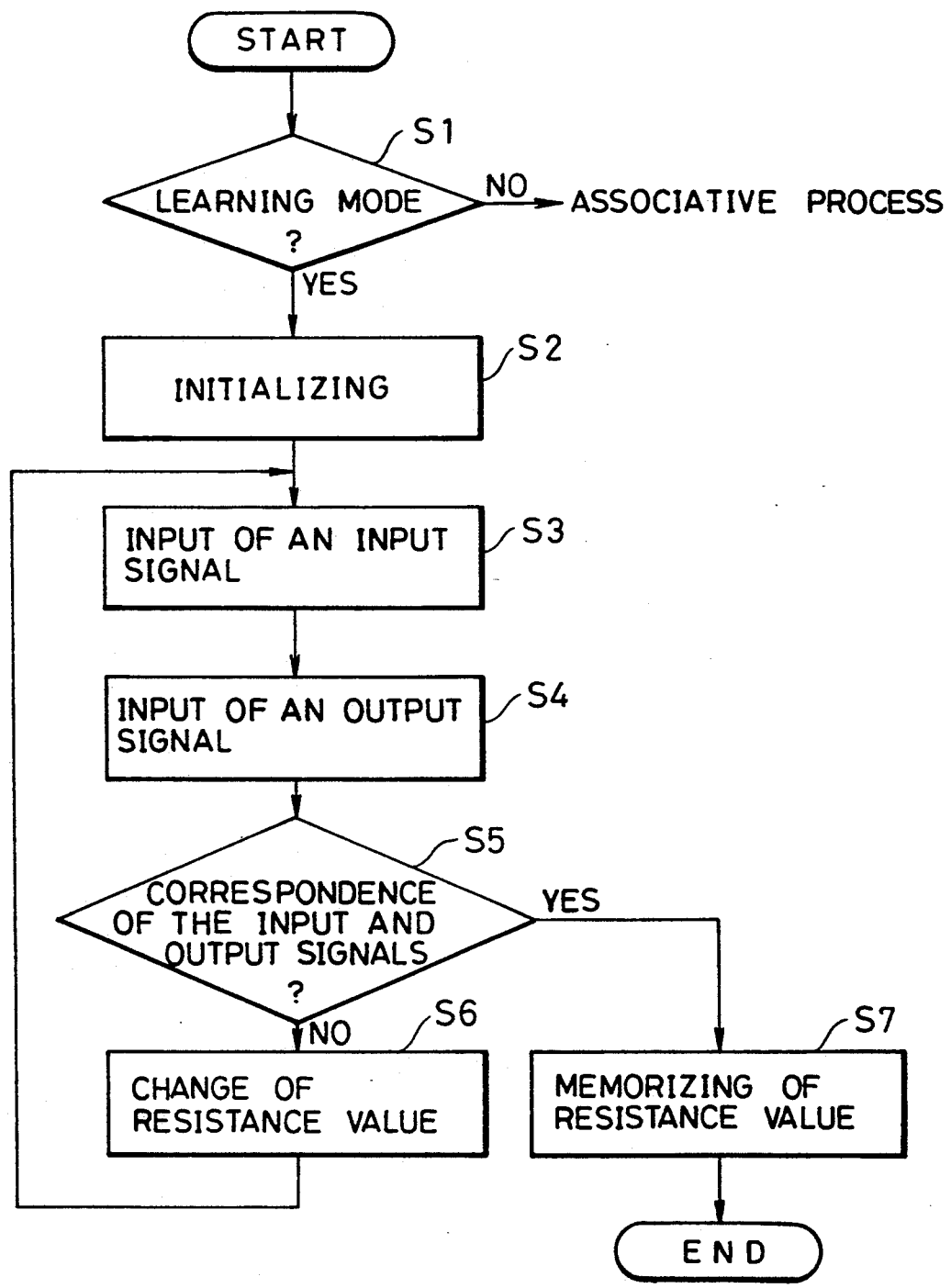
Figure 9:
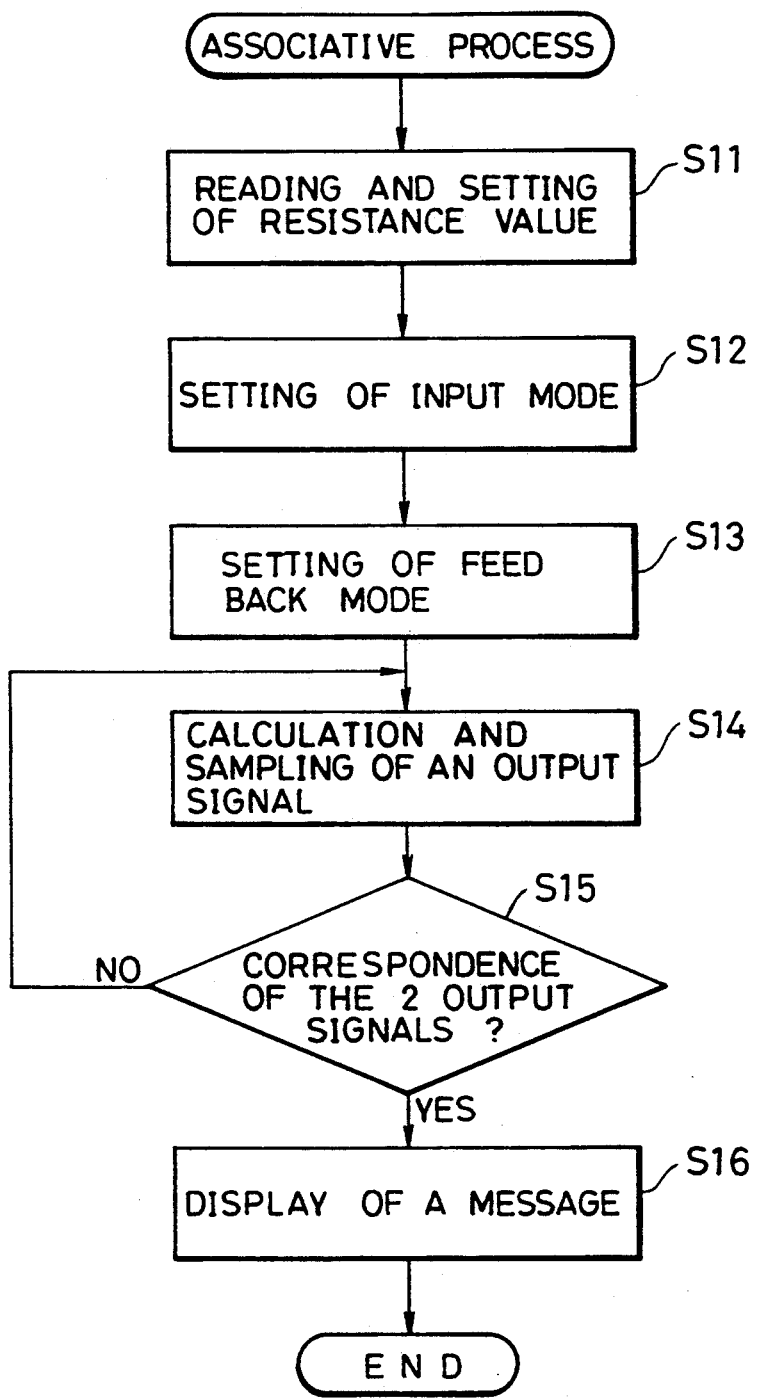
Figure 10:
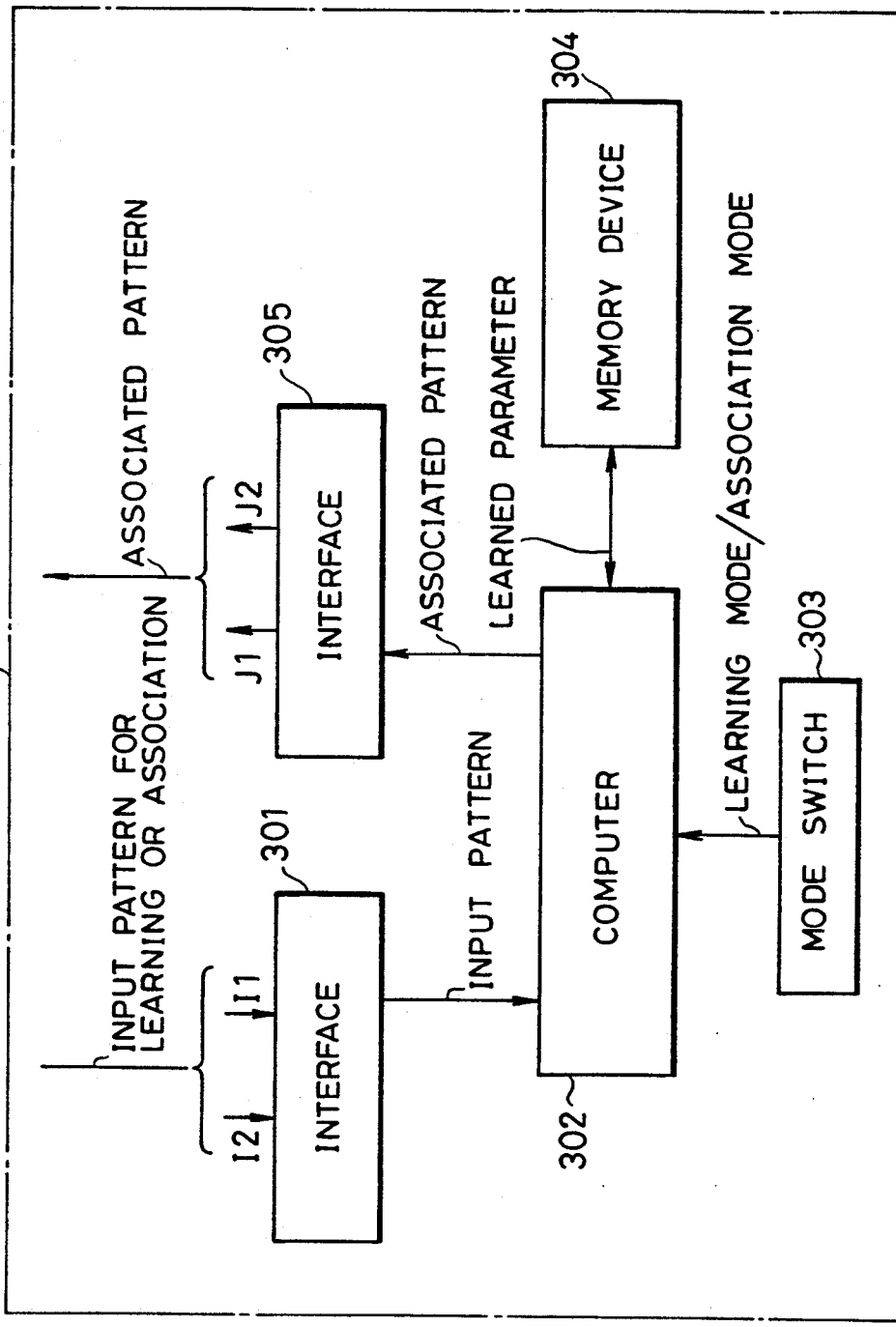
Figure 11:
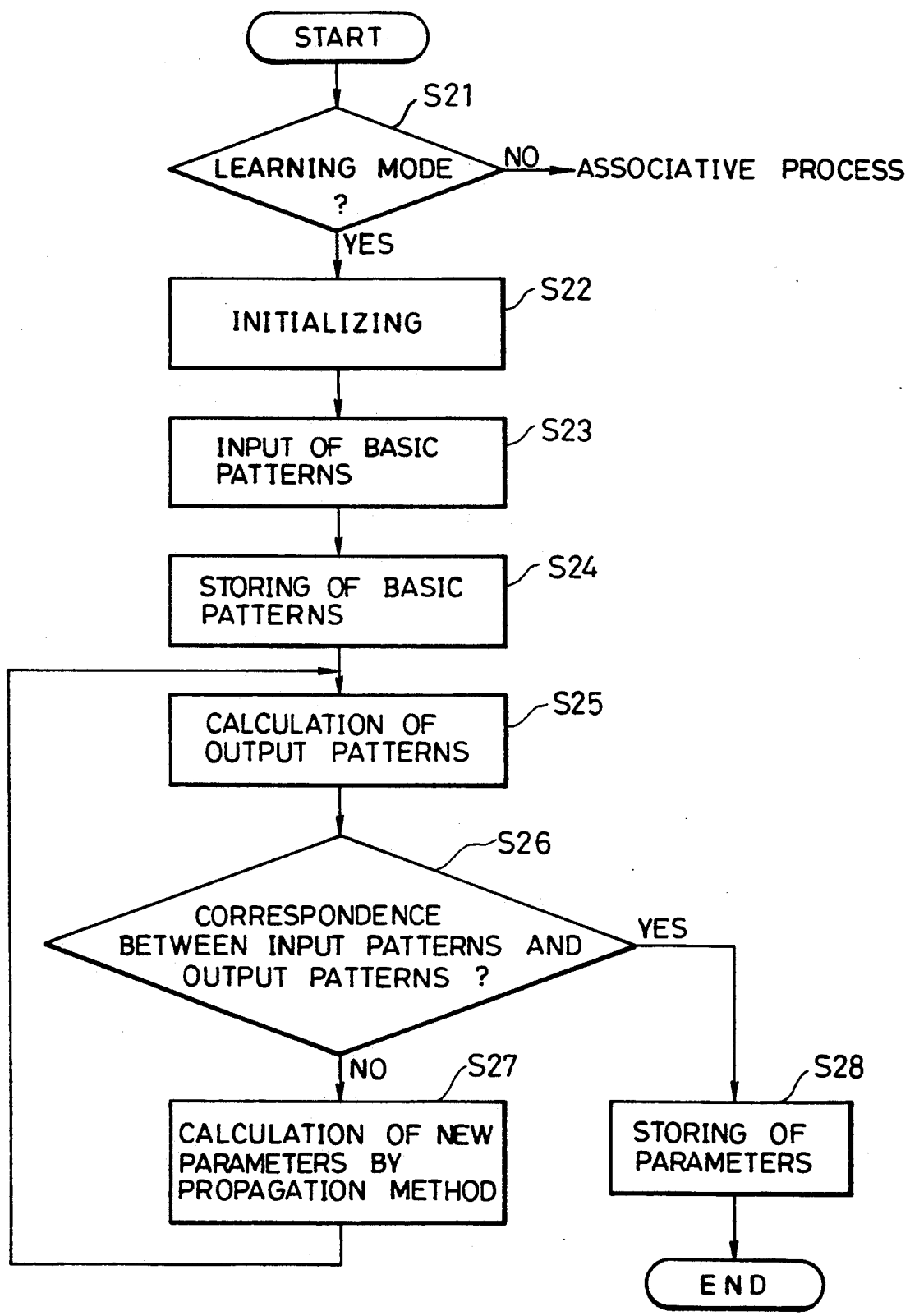
Figure 12:
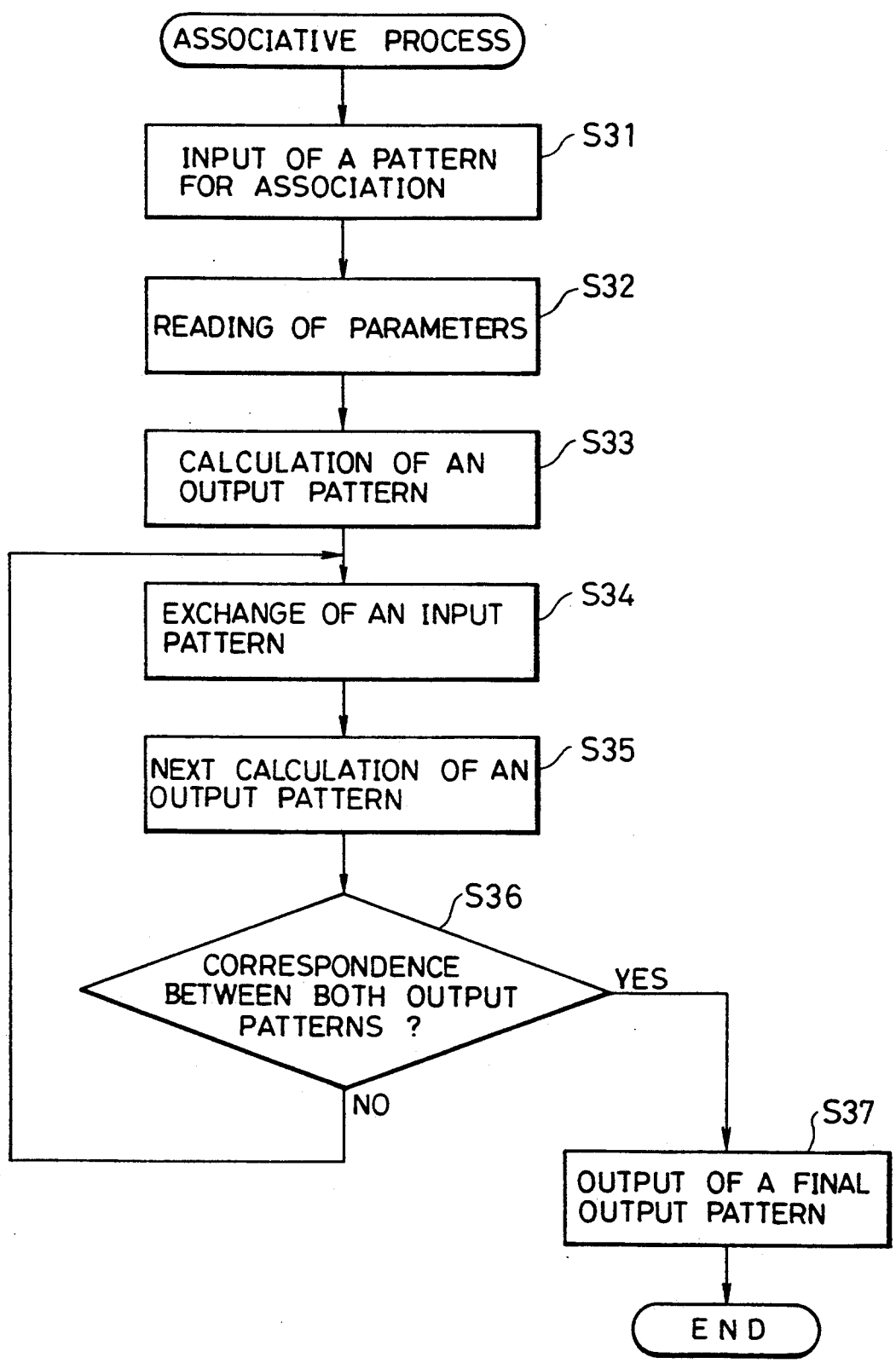
Figure 13:
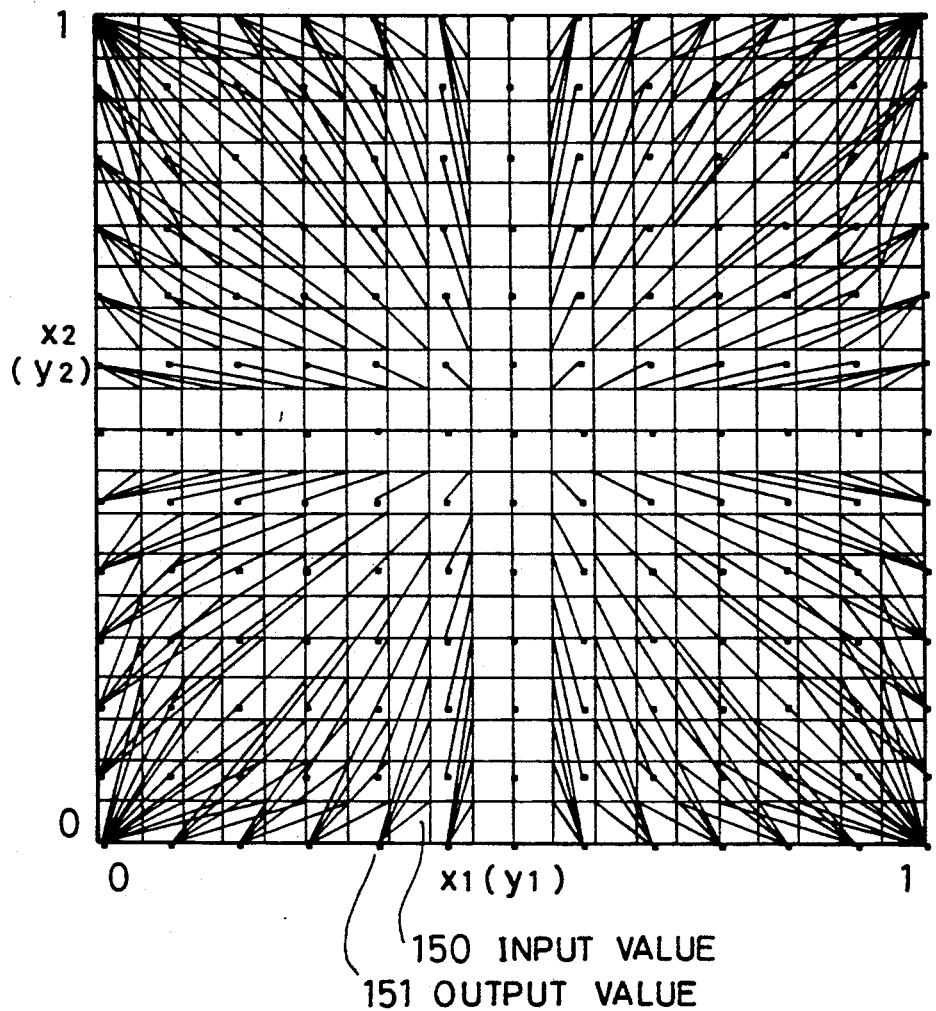

FIG. is a block diagram showing a circuit in the second embodiment of the present invention;

FIGS. 8 and 9 are flow charts each illustrating control procedures carried out by a host computer 220 shown in FIG. 7;

FIG. 10 is a block diagram showing a circuit in the third embodiment of the present invention;

FIGS. 11 and 12 are flow charts each illustrating control procedures carried out by a host computer 302 shown in FIG. 10; and FIG. 13 is an explanatory diagram showing the conversion of the input patterns into the output patterns in the conventional system.

DETAILED DESCRIPTION OF PREFERRED EMBODIMENTS

Figure 1:
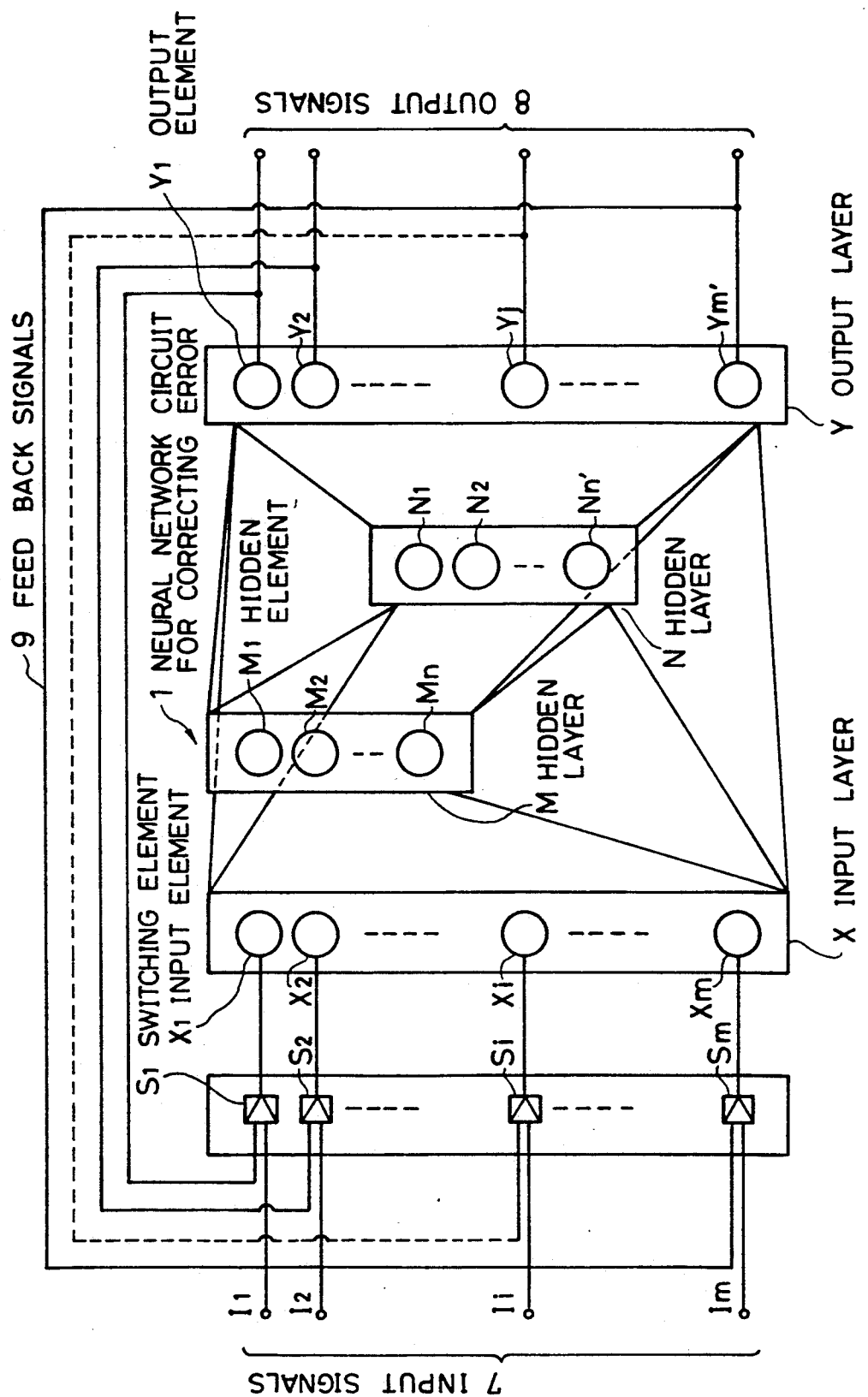
FIG. 1 is a block diagram showing the basic circuit in the first embodiment of the present invention.

FIG. 1 shows an arrangement of a basic circuit in the first embodiment of the present invention. In this figure, a symbol $X_i (i=1, 2, \text{———}, m)$ means an i-th element in a group of elements which constitutes an input layer X and a symbol $Y_j (j=1, 2, \text{———}, m')$ a j-th element in a group of elements which constitutes an output layer Y. Likewise, symbols $M_k$(k=1, 2, ———, n) and $N_p$(p=1, 2, ————. n') represent k-th and p-th elements in groups of elements which constitute hidden layers M and N arranged between the input layer X and the output layer Y. The connections between the input layer X and the hidden layers M and N and between the input layer X and the output layer Y are realized by a group of wirings. In addition, the connections between the hidden layers M and N and between the hidden layer M and the output layer Y are realized by groups of wirings. Moreover, the connection between the hidden layer N and the output layer Y is also realized by a group of wirings. Thus, all the elements of the front layer are connected to all the elements of the real layer through a plurality of wiring groups arranged in the form of neural networks. Moreover, each element has a bias activity value $\theta$. Further, there are provided feedback wirings between the output layer Y and the input layer X. An input signal practically inputted to an input element $X_i$ is an external input signal $I_i$ or an output feedback signal $Y_i$. In this case, the selection of input signals is performed by a switching element $S_i$.

The basic operation of each element will hereunder be explained. Now we assume that an element A is received an input action $b_i$ from K pieces of input elements $B_i$(i =1, 2, ————, k). If the transfer efficiency of the connection between the input elements $B_i$ and the element A is now assumed to be $w_i$ and the bias of the element A is $\theta$, the output activity a of the element A is determined according to the following formula:

$$a = f\left(\sum_{i=1}^{k} w_i * b_i + \theta\right)$$

Wherein f is called an output function and usually a sigmoid function or a logistic function is used. If an input pattern comprising a plurality of signals is given, the output activity is calculated according to the foregoing formula by each element from the input layer to the output layer and finally an output pattern of one step is outputted from the output layer. In this respect, when the input pattern is learned and memorized, the transfer efficiency $w_i$ and the bias $\theta$ are determined according to a learning method called a back propagation method or a method similar thereto in order to output a same pattern from an output layer as a pattern given to an input layer for learning.

The back propagation method is a learning method by a lamellar multi-layered learning circuit, which was proposed by Amari and has recently been reconsidered by Rumelhart. The back propagation learning method will be briefly explained below.

We now assume that an input pattern PI to be learned is given to the input layer X and that after the activity of each layer is calculated one by one, the output value of an output element $Y_j$(j =1, 2, ————, m') in the output layer Y is then obtained. Moreover, a target output pattern for learning is assumed to be PO ($PO_j$=1, 2, ————, m')).

In the back propagation learning, in order to put the output pattern Y close to the target output pattern PO, the least square error between two patterns in each element is brought close to zero. For this purpose, the following correction of the transfer efficiency of a connection is carried out.

If the aforementioned element A is an output element $Y_j$, its output is activity $Y_j$ and the target output for learning is $po_j$, the quantity $\Delta W_i$ of correction of the connection can be determined according to the following formulae:

$$\Delta W_i = -\epsilon * d_j * b_i$$

$$d_j = (Y_j - po_j) * Y_j * (1 - Y_j)$$

Wherein $d_j$ is the estimated value of the error. $\epsilon$ is a parameter for determining the magnitude of correction per one correction operation and is a positive small constant. $b_i$ is the activity of the element in the front layer connected to the wiring having a transfer efficiency of $W_i$.

A correcting of bias value $\theta$ is performed in according to a following formula similar to the formula for the correcting of the transfer efficiency $W_i$, and level of the supposed input equals to "1".

$$\Delta \theta = -\epsilon * d_j$$

$$d_j = (Y_j - PO_j) * Y_j * (1 - Y_j)$$

As to elements (hereafter referred to as element A) of the hidden layer M and N, the quantity $\Delta W_i$, $\Delta \theta$ for correction of a connection can be calculated according to the following formula similar to the foregoing formula by propagating the error already calculated in the rear layer from back to front:

$$\Delta W_i = -\epsilon * d * b_i$$

$$\Delta \theta = -\epsilon * d_j$$

$$d = (\Sigma W_k * d_k) * a * (1 - a)$$

In the formula for obtaining d, $\Sigma$ means that all the products of the error $d_k$ of the element in the rear layer connected to the element A with the transfer efficiency $w_k$ of its connection should be summed up.

In the learning and memory mode, the transfer efficiency of the pattern to be learned and memorized is corrected in turn from the rear layer to the front layer whereby a learning of foregoing back propagation method is performed. After this learning transfer efficiency of the connection and the bias are decided in every elements. In the recollection mode, the foregoing calculation of the output action is repeated after receiving an incomplete input to calculate an output value $Y_i$ and performing feedback of the output value $Y_i$ to an input value $x_i$. Since the error correcting circuit is adjusted and constructed so as to discriminate one learned pattern from the other patterns according to error correction learning algorithm based on the back propagation, the input pattern is discriminated every time when a pattern inputted through a feedback loop passes through the error correcting circuit, while the output pattern converges to one of the learned patterns memorized in the foregoing learning and memory mode.

Figure 2:
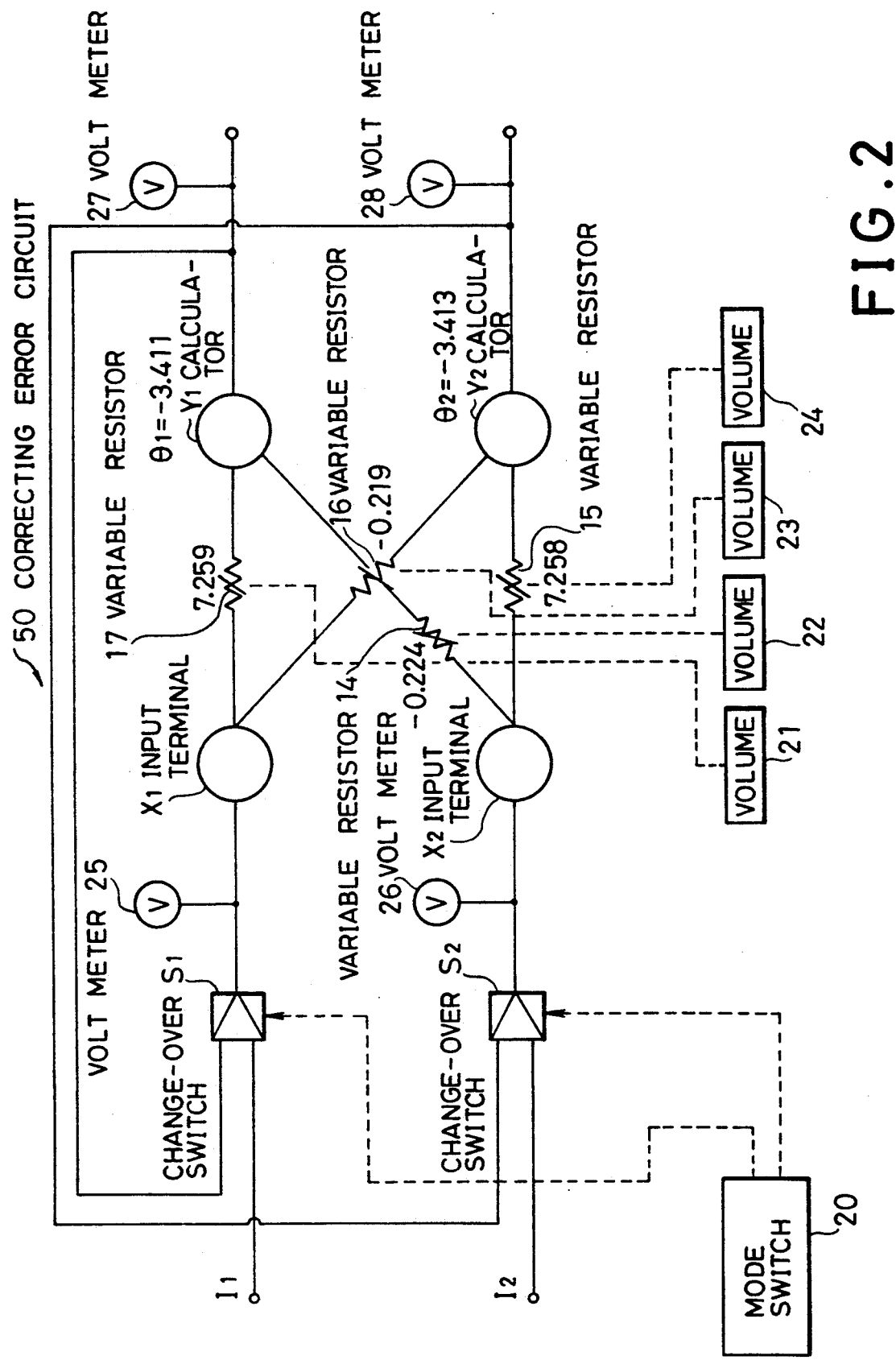
FIG. 2 is a circuit diagram showing a specific example of the circuit shown in FIG. 1. This circuit learns four patterns (0, 1), (1, 0), (1, 1) and (0, 0) according to the backpropagation method.

FIG. 2 shows the arrangement of a circuit in which the association and memory of patterns are performed by two inputs and two layers. In this embodiment, number of elements constituting each of the input layers and the output layers is two and the hidden layer is omitted.

In Fig. 2, the symbols $X_1$ and $X_2$ each represents an input element which is a terminal in this embodiment. The symbols $Y_1$ and $Y_2$ each represents an output element which is a calculator. The symbols $I_1$ and $I_2$ each represents an input signal and the symbols $S_1$ and $S_2$ each represents a switch for changing over the feedback signal from the output and the input signals. The connections between the input elements $X_1$ and $X_2$ and the output elements $Y_1$ and $Y_2$ are connected with wirings 14, 15, 16 and 17 in the form of a numeral network. Each wiring is provided with a variable resistor 14, 15, 16 or 17 having a desired transfer efficiency. The transfer efficiencies of the variable resistors 14 to 17 are determined by adjusting the resistance value of volumes 21 to 24. The transfer efficiency represents a positive value when a current flows from upstream to downstream, and in the reverse case the transfer efficiency represents a negative value. Reference numeral 20 represents a mode switch which instructs the signal switching to switches $S_1$ and $S_2$.

Reference numerals 25 and 26 each represents an instrument for detecting the level of the input signals, for instance, a voltmeter for determining voltage. Reference numerals 27 and 28 each represents an instrument for detecting the level of output signals. The operator carries out the judgement of whether the input pattern coincides with the output pattern or not; or whether the output pattern converges or not by comparing the values determined by the instrunments 25 to 28. If the input signal is "0" or "1", there are four patterns, i.e., (0, 0), (1, 0), (0, 1) and (1, 1) as the input pattern $(x_1, x_2)$ capable of being memorized. In this respect, the desired associative learning is to obtain an output pattern indentical with the corresponding input pattern when each of these 4 input patterns is inputted. Thus, these 4 patterns are in turn inputted in the input elements $(X_1, X_2)$ through the change-over switches $S_1$ and $S_2$. Next, the transfer efficiency of the wirings are changed by adjusting the volumes 21 to 24 so that each input pattern coincides with the corresponding output pattern and then learning and memory of the input patterns according to a back propagation method are performed. In Fig. 2, there are shown an example of values of the transfer efficiency and the bias obtained after learning these 4 learning patterns (0, 0), (1, 0), (0, 1) and (1, 1). The above-mentioned learning patterns are not linearly independent and therefore, it should be noted that in the present invention, patterns which cannot be learned and even cannot be memorized in the conventional pattern associative memory system, can be learned and memorized.

Figure 3:
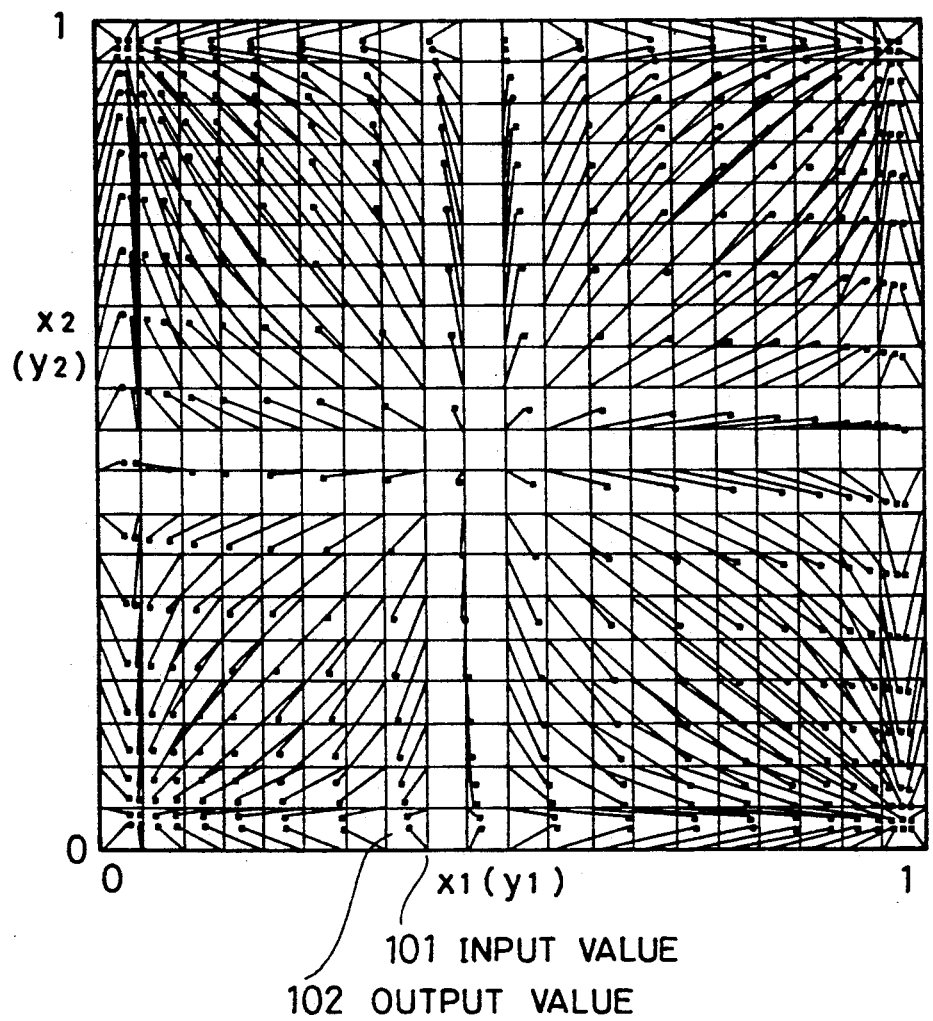
FIG. 3 is an explanatory diagram illustrating the conversion of the input values into the output values when various input values are inputted to the circuit shown in FIG. 2.

A way of looking at FIG. 3 will now be explained (the same will apply to FIGS. 4, 5 and 10). If the inputs are two-dimensional and comprise $x_1$ and $x_2$ and each of the inputs $x_1$ and $x_2$ may be any value ranging from "0" to "1", all the inputs being possible to exist can be expressed as a state space as shown in FIG. 3 Likewise, all the outputs being possible to exist may also be written in superposed states as shown in FIG. 3. In FIG. 3, the input state space (i.e., the input values) is shown as a mesh having intervals of 0.05 and the output values outputted from the output layer of the circuit whose input layer has received an input signal, is shown as symbol □. FIG. 3 also shows the correlation between the input value of the input signal and the corresponding output value in the output state space. If the output $(y_1, y_2)$ is brought back to the input $(x_1, x_2)$ for feedback, the level of the output $(y_1, y_2)$ becomes the next input value of the input $(x_1, x_2)$ and the above-mentioned conversion of the input value into the output value is repeated whereby the output value converges to a specific value. Therefore, phenomena such as convergence occurring in the error correcting circuit 50 as shown in FIG. 2 can be visually seen in FIG. 3.

Then, the process of correcting errors of the input signals by the error correcting circuit 50 shown in FIG. 2 will hereunder be explained. For example, if an incomplete pattern differing from the learned patterns such as a pattern (0.4, 0.6) is inputted to the error correcting circuit 50, output value calculated by the circuit from the input value becomes (0.345, 0.701) as shown in FIG. 3. As this step is in the recollection mode, the mode switch 20 is switched so that the feedback signal is inputted to the input elements $X_1$ and $X_2$. When the output $Y_1$ is returned to the input $X_1$ and the output $Y_2$ to the input $X_2$ for feedback, the output pattern varies in turn (0.257, 0.882)→(0.150, 0.929)→(0.074, 0.964) to thus gradually approach to a learning pattern (0, 1). But, it does not converge to the complete pattern (0, 1) if the learning is incomplete.

Since the error correcting circuit 50 performs feedback calculation so that the pattern to be associated approaches either of the learned patterns (0, 0), (1, 0), (0, 1) and (1, 1) even if any value of a pattern to be associated is inputted into the error correcting circuit, the ouput pattern necessarily converges to either of these four patterns. Thus, FIG. 3 shows that a correct output value is outputted for any input values. In this embodiment, four divided regions for judging which learning pattern is similar to an input pattern are those approximately divided by $x_1=0.5$ and $x_2=0.5$.

Such divided regions vary depending on the signal construction of the learning patterns and the learning frequency of each pattern.

Figure 4:
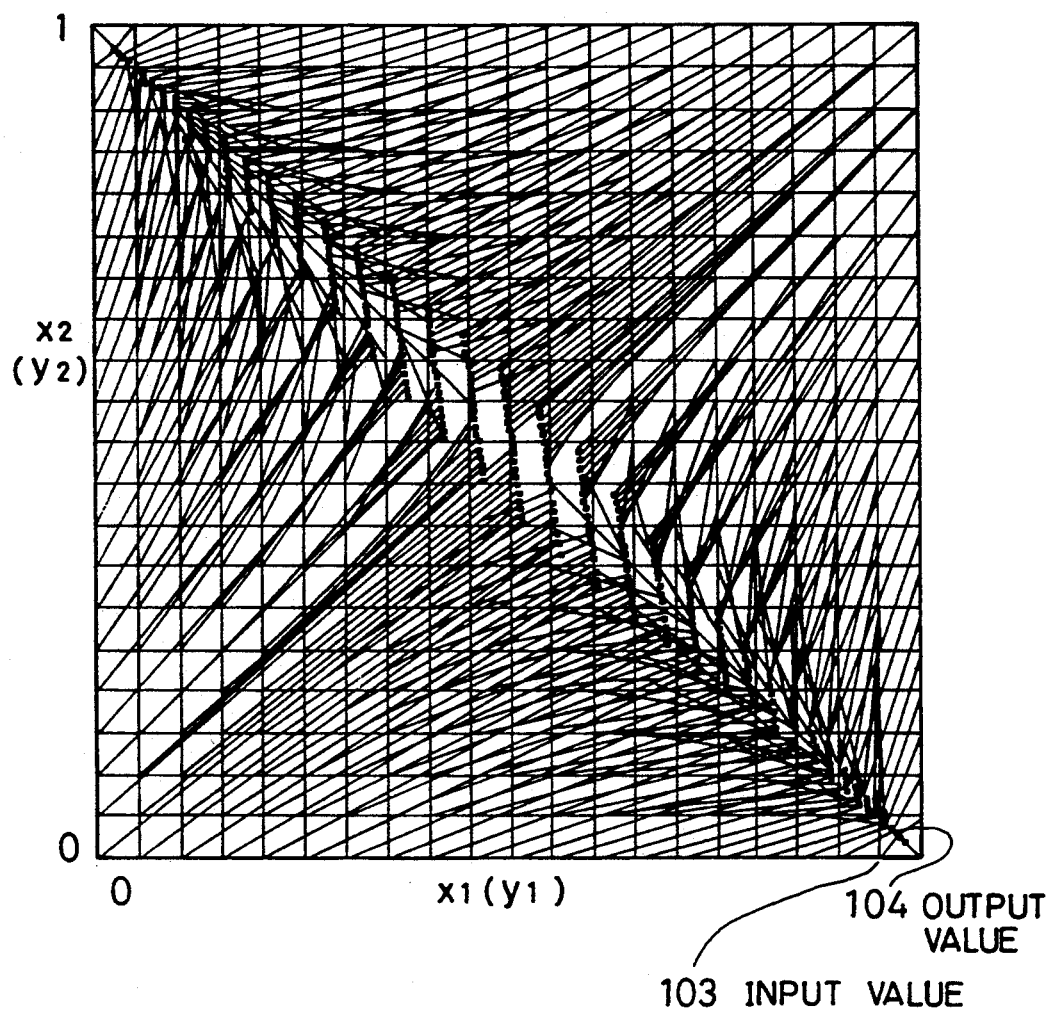
FIG. 4 is an explanatory diagram illustrating the conversion of the input values into the output values when various input values are inputted to the corcuit shown in FIG. 2 after making the circuit learn the patterns (0, 1), (1, 0) according to the backpropagation method.

FIG. 4 shows the change of the output value corresponding a level value of each input signal, in one calculation when the same circuit as that shown in FIG. 2 learned two patterns (0, 1) and (1, 0). As seen from FIG. 4, it is also clear that an input pattern to be associated is converted into an output pattern resemble to a learned pattern. Moreover, it is also clear from FIG. 4 that the distribution of the output patterns divides the input-output state space into two sub-regions. The division line of the divided regions is approximately defined by a formula: $x_1=x_2$. Unlike the output results of the conventional associative memory obtained under the same conditions as those used in this embodiment as shown in FIG. 13, the circuit clearly performs correct recollection.

Figure 5:
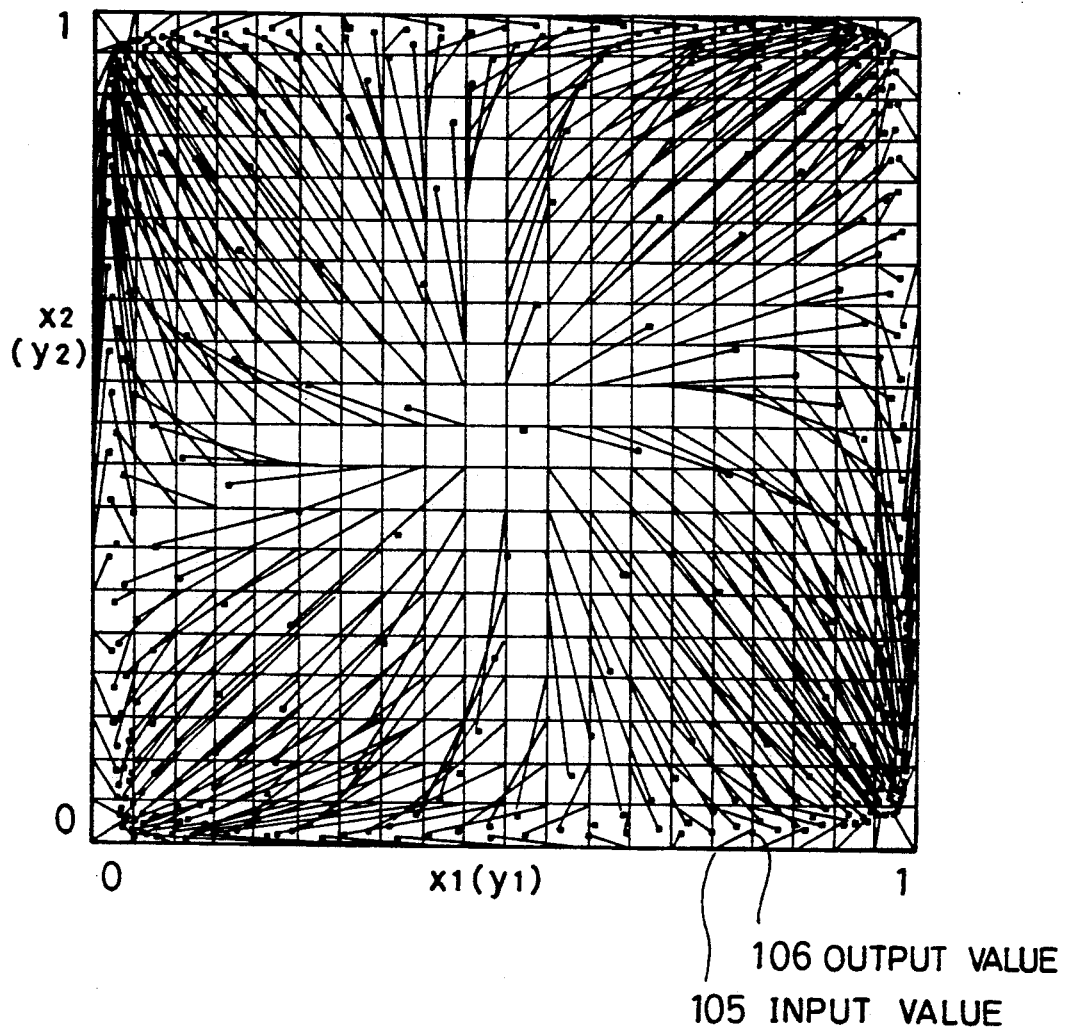
FIG. 5 is an explanatory diagram illustrating the conversion of the input values into the output values when various input values are inputted to an associative memory circuit, having two inputs three layers construction after making the circuit learn four patterns (0, 1), (1, 0), (1, 1) and (0, 0) according to the backpropagation method.

In FIG. 5, there is described an example of operation of a 2 inputs-3 layers multi-layered pattern associative memory system which comprises one hidden layer in addition to the arrangement of the error correcting circuit 50 shown in FIG. 2. The hidden element constructing the hidden layer is used the same element as the output element. In this multi-layered pattern associative memory system according to this embodiment, only one hidden layer is present, every two elements are included in the input, hidden and output layers and the input layer is not directly connected to the output layer. In this embodiment, there are used four patterns (0, 0), (1, 0), (0, 1) and (1, 1) as the learning patterns to be previously learned and memorized. The multi-layered pattern associative memory system outputs an output pattern similar to the learned pattern necessarily as accurately as the pattern associative memory system comprising 2 layers of the input and output shown in Fig. 3. In general, it is posssible to learn more complicated patterns for a multi-layered pattern association, if the dimension of inputs becomes large, it is preferred that an error correcting circuit is designed to have a multi-layered structure.

An example in which the embodiment according to the present invention is adopted will hereunder be explained. Numeral patterns handled as a part of patterns, are used sequence of alphabetic characters: (one, two, three, four, five, six, seven, eight, nine). The sequence of alphabetic characters is inputted to the elements $X_1$ to $X_{40}$ of the input layer of the pattern associative memory system as signals in the form of asky (ASC) code in the learning and memory mode. In addition, there are inputted to the elements $X_{41}$ to $X_{65}$ alphabetic image patterns (1, 2, 3, 4, 5, 6, 7, 8, 9) expressed as dot signals of 5 dots * 5 dots. Thereafter, the error correcting circuit learns and memorizes pairs of the alphabetic character sequence patterns and alphabetic image patterns, i.e., ((one, 1), (two, 2), ..., (nine, 9)) according to the back propagation method.

FIG. 6 shows the processes for establishing the alphabetic image patterns and the alphabetic character sequence of numeral 6 through three cycles of feedback after the patterns of alphabet sequence of numeral "six" and the alphabetic image are inputted to the circuit. It is clear from FIG. 6 that correct patterns free of noises are recollected through the feedback processing of the error correcting circuit even if a part of the alphabetic image pattern is deformed or a part of the character code sequence is deformed and converted to another code due to such noises.

In the pattern associative memory system according to this embodiment, the learning and memory for correcting errors of the input patterns and the output patterns; and the recollection operation in which feedback processing is performed are carried out. Therefore, the ability of recollection of the patterns memorized according to the auto-memory principle is very strong. For instance, if only "0" which is part of the character sequence is inputted as a pattern to be recollected, the system can recollect both the character pattern and character sequence which are learned and memorized. In addition, after the error correcting circuit learns two kinds of character image patterns with respect to the character sequence "one", it can selectively recollect one of a plurality of character image patterns. In this case, the character sequence "one" is fixed if the output pattern is not a desired one and, for instance, if the value of an output element is "1", next this value of the output element is replace with "−1" to negate the presently associated character pattern, and, then a feedback processing is performed. As the result, another learned and memorized character pattern will be recollected.

As has been explained above, the pattern associative memory method according to the first embodiment exhibits learning and memory characteristics such that any patterns may be memorized and recollection characteristics with a high accuracy and, therefore, the present invention can be applied to various information processings such as conversion of vague information into correct one and spelling check of words by making most use of these characteristics which are never provided by conventional pattern associative memory methods.

In the first embodiment according to the present invention, the transfer efficiency of the error correcting circuit is manually established. The second embodiment in which the foregoing transfer efficiency can be automatically set will hereunder be explained.

FIG. 7 shows the circuit construction of the second embodiment of the present invention.

In FIG. 7, reference numeral 200 represents an error correcting circuit to which a pattern to be associated is inputted and which outputs a learned pattern most resembling the pattern to be associated. The error correcting circuit 200 may have the same circuit construction as that shown in FIG. 1 and, therefore, detailed explanation thereof is omitted.

Reference numeral 201 represents switching device for change-over, which selectively input, to the error correcting circuit 200, a plurality of feedback signals 206 and a plurality of input signals 204. A signal for instructing switching to the switching device 201 is outputted from either a mode switch 202 or a host computer 220.

Reference numeral 210 represents an interface which converts each level value, for instance, a value of voltage of a plurality of input signals inputted to the error correcting circuit 200, into a digital value and then transmits the level value in the digital form to the host computer 220. The interface 210 performs level conversion of the foregoing switching instruction signal outputted from the host computer 220 to an operation level of the switching device 201.

Reference numeral 211 represents an interface which transmits, to the error correcting circuit 200, transfer efficiency information such as values of resistances instructed by the host computer 220. The value of a resistance of a plurality of variable resistors disposed on the wirings within the error correcting circuit 200 is determined by the aforesaid transfer efficiency information.

Reference numeral 212 represents an interface which converts, into a digital value, each level value of a plurality of output signals from the error correcting circuit 200 and then transfers the level value in the digital form to the host compuetr 220.

Reference numeral 213 represents a keyboard for instructing and inputting the learning mode or the recollecting mode to the host computer 220 in the form of a programming language instruction.

The host computer 220 controls whole the operations of the device. In addition, the host computer 220, in the learning mode, calculates the transfer efficiency of the error correcting circuit 200 and memorizes the calculated result in a memory device 214. The host computer 220, in the recollecting mode, judges whether the output signal converges or not by monitoring the level of the output signal. If the output signal converges, a message for representing that the association processing is finished, is displayed on a display device 215 corresponding to the instruction of the host computer 220. The interface 210 to 212, the keyboard 213, the memory device 214, the display device 215 and the host computer 220 are connected to a common bus 216.

The operations of the second embodiment according to the present invention will be explained with reference to the flow charts shown in FIGS. 8 and 9. FIG. 8 shows the control procedures performed by the host computer 220 in the learning mode and FIG. 9 shows the control procedures performed by the host computer 220 in the recollecting mode.

When an operator instructs the host computer to take the learning mode through the keyboard 213, the host computer 220 establishes a predetermined initial values of parameters used for calculating the transfer efficiency and gives the error correcting circuit 200 initial values of the transfer efficiency (step S1→step S2).

Then, the host computer 220 transmits the switching instruction signal to the switching device 201 to switch over the connection to the side of the input signal 204 and then receives the input signal 204 to be learned through the switching device 201→the interface 210 (step S3).

The input signal 204 to be learned is also inputted to the error correcting circuit 200. This input signal 204 is held and outputted from an external device, for instance, an image processing device or a voice processing device during learning.

Thereafter, the host computer 220 receives an output signal 205 from the error correcting circuit 200 through the interface 212 (step S4).

The host computer 220 judges whether each level value of the input signal 204 coincides with each output signal 205 corresponding to each signal of the input signal 204 or not, in other words, whether the input pattern coincides with the output pattern or not.

If the input pattern does not coincide with the output pattern, the presently established transfer efficiency (e.g., each values of the resistances) is corrected by adding a constant value or subtracting a constant value from the presently established transfer efficiency. In this respect, the time required for the learning processing can be reduced if the value of correction determined according to the aforesaid propagation method is used as the value of correction. The corrected transfer efficiency is inputted to the error correcting circuit 200 (step S6).

If the resistance value of each of the variable resistors in the error correcting circuit 200 is set at the resistance value of the instructed transfer efficiency, the error correcting circuit 200 performs level conversion based on the newly established transfer efficiency. The host computer 220 compares the pattern of the input signal 204 with a pattern of the newly outputted from signal 205 (step S3→step S4→step S5).

If the input pattern does not coincide with the output pattern, the correction of the transfer efficiency of the error correcting circuit 200 is performed (step S6). Thereafter, the foregoing steps S3 to S6 are repeated until the input pattern coincides with the output pattern.

If the input pattern coincides with the output pattern within a predetermined precision, the host computer 220 stores the present established transfer efficiency values in the memory device 214 and then displays a message to the effect that the learning is finished on the display device 215 to thus finish the present control procedures (step S5→step S7).

The recollection processing will hereunder be explained. When the recollecting mode is designated through the keyboard 213, the host computer 220 performs the control procedures as shown in FIG. 9. According to this control procedures, first of all, the transfer efficiency established in the learning mode is outputted from the memory device 214. Then, the transfer efficiency of the error correcting circuit 200 is established by the host computer 220 so as to be equal to this outputted transfer efficiency (step S11).

The host computer 220 transmits a switching instruction signal for inputting an input signal to the switching device 204. As a result, a input signal 204 to be recollected is inputted to the error correcting circuit 200 (step S3). When the host computer 220 detects that the first calculation of the error correcting circuit 200 is finished based on the change in the output level of the circuit 200, the host computer 220 transmits a switching instruction signal to the switching device 201 to switch the connection of the device 201. As a result, the error correcting circuit 200 repeatedly performs error correction calculation for association since a feedback signal 206 is inputted to the circuit till an instruction for stopping the operation is inputted thereto.

The host computer 220 performs sampling of the output signal 205 from the error correcting circuit 200 at constant time intervals (step S14).

The host computer 220 compares the level value of the output signal 205 sampled this time with that of the output signal of the last sampling, at every time of sampling (step S15).

When the level value of the signal sampled this time and that of the signal of the last sampling approximately coincide with one another, the host computer 220 judges that the output signal converges and transmits such a message and an association result to the display device 215 to let it display and to thus finish the control procedures (step S5→step S7).

On the other hand, when the level value of the signal sampled this time and that of the signal of the last sampling do not coincide with one another, the procedure of step S14 is repeated and the host computer 220 continues the sampling of the output signal 205.

As the operator can recognize the completion of the association processing and the result on the basis of the message displayed on the display device 215, it is not necessary to monitor the level of the output signal 205 using a voltmeter and thus operations of the operator are simplified.

In this embodiment, an example wherein a pair of patterns is learned is shown, but if it is also possible to learn two or more pairs of patterns. For example, a first pair of input patterns and a second pair of input patterns are alternately inputted to the error correcting circuit 200 at constant intervals. The host computer 220 compares alternately outputted two output patterns with two input patterns respectively. More specifically, a transfer efficiency which is common to those two patterns is set according to a back propagation method so that the coincidence between the first input pattern and the first output pattern and between the second input pattern and the second output pattern are achieved. When a source pattern to be recollected in the recollection mode, an output pattern most resemble to the source pattern to be recollected out of the foregoing two output patterns is outputted from the error correcting circuit 200 as a result of its feedback processing.

In the first and second embodiments, the error correcting circuit 200 is constructed in the form of an analog circuit. An embodiment in which a computer performs the learning and association processings carried out by the error correcting circuit 200 in the foregoing embodiment will now be explained below.

FIG. 10 is a diagram illustrating the circuit structure of a third embodiment according to the present invention.

In FIG. 10, reference numeral 301 represents an interface which inputs a pattern signal to be learned in the learning mode and inputs a pattern signal to be recollected in the recollecting mode. Reference numeral 302 represents a computer performing learning and recollection processings of input patterns.

As the computer 302, various kinds of computers such as chip of a central processing unit (CPU), a personal computer and a super computer may be used. The numeral 303 represents a mode switch for instructing and inputting the learning mode or the recollection mode.

Reference numeral 304 represents a memory device for memorizing transfer efficiency data determined by the computer 302 and processing data used in the calculation processing in the computer 304.

Reference numeral 305 represented an interface which serves to output recollection results calculated by the computer 302 in the recollection mode.

The operations of a pattern associative memory device 300 having such a construction will hereunder be explained with reference to the flow charts shown in FIGS. 11 and 12.

FIG. 11 is a diagram showing control procedures performed by the computer 302 in the learning mode and FIG. 12 is a diagram showing control procedures performed by the computer 302 in the recollection mode.

This embodiment is given for explaining a case wherein the computer 302 performs identical processing to those performed by the error correcting circuit 50 shown in FIG. 2.

An operator manipulates the mode switch 303 and thus instructs the computer 302 to take the learning mode (step S21). The computer 302 performs an initialization processing and then inputs pattern information to be learned, inputted through the interface 301, to the memory device 304 to store it (step S22→step S23).

Subsequently, the error correction calculation of two inputs is performed on the basis of this pattern information. The kinds of parameters used in this calculation are as follows:

$PO_1$: the level value of a pattern signal to be learned;
$PO_2$: the level value of a pattern signal to be learned;
$b_1$: the input action of the input element $X_1$ shown in FIG. 2;
$b_2$: the input action of the input element $X_2$ shown in FIG. 2;
$w_1$: the transfer efficiency of the variable resistor 17 shown in FIG. 2;
$w_2$: the transfer efficiency of the variable resistor 14 shown in FIG. 2;
$w_1$': the transfer efficiency of the variable resistor 16 shown in FIG. 2;
$w_2$': the transfer efficiency of the variable resistor 15 shown in FIG. 2;
$y_1$: the input action of the input element $Y_1$ shown FIG. 2;
$y_2$: the input action of the input element $Y_2$ shown in FIG. 2;
f: sigmoid function;
$\theta_1$: bias due to the output element $Y_1$;
$\theta_2$: bias due to the output element $Y_2$;

In addition, the output action $y_1$ and $y_2$ are given by the following formulae, respectively:

$$y1 = f\left(\sum_{i=1}^{2} w_i * b_i + \theta_1\right); \text{ and}$$

$$y2 = f\left(\sum_{i=1}^{2} w_i' * b_i + \theta_2\right).$$

The computer 302 sets initial values of $w_1$, $w_2$, $w_1$', and $w_2$', and then calculates the output actions $y_1$ and $y_2$ according to the foregoing formulae (step S25).

The computer 302 compares the level value $PO_1$ of a pattern signal with the output action $y_1$; and the level value $PO_2$ of a pattern signal with the output action $y_2$, respectively. (step S26). When there is not observed any coincidence in comparing the foregoing input actions with the foregoing output actions, the transfer efficiency and the bias are corrected according to a back propagation learning method explained below.

First of all, differences $d_1$ and $d_2$ (errors) between a learning pattern ($po_1$, $po_2$) and an output pattern ($y_1$, $y_2$) are calculated by the following formulae based on the propagation learning method:

$$d_1 = (y_1 - po_1) * y_1 * (1 - y_1);$$

$$d_2 = (y_2 - po_2) * y_2 * (1 - y_2).$$

Thereafter, using these errors $d_1$ and $d_2$, correction $\Delta w_1$ and $\Delta w_2$ with respect to 2 set of the transfer efficiency $w_1$ and $w_2$ of the wirings of the output element $y_1$ and the amount of correction $\Delta\theta_1$ with respect to the biases $\theta_1$ and $\theta_2$ are calculated according to the following formulae:

$$\Delta w_1 = -\epsilon * d_1 * x_1$$

$$\Delta w_2 = -\epsilon * d_1 * x_1$$

$$\Delta\theta_1 = -\epsilon * d_1$$

Wherein $\epsilon$ is a positive constant, ($x_1$, $x_2$) are input patterns, the objective patterns equal to the input patterns in this example. Moreover, correction $\Delta w_1$, and $\Delta w_2$, with respect to 2 set of the transfer efficiency $w'_1$, and $w'_2$, of the wirings of the output element $Y_2$ and correction $\Delta\theta_2$ are likewise calculated according to the following formulae:

$$\Delta w'_1 = -\epsilon * d_2 * x_1$$

$$\Delta w'_2 = -\epsilon * d_2 * x_2$$

$$\Delta\theta_2 = -\epsilon * d_2$$

The computer 302 corrects the presently established values of plural set of the transfer efficiency and the bias on the basis of the thus calculated amounts of correction (step S27).

Then, the error correction calculation of the input patterns ($x_1$, $x_2$) is performed on the basis of the corrected values of the transfer efficiency and the bias. After the correction of the transfer efficiency and the bias is thus repeated until the output pattern ($y_1$, $y_2$) coincides with the objective pattern ($PO_1$, $PO_2$), the host computer 302 stores each of the transfer efficiency and each of the bias at which at output pattern coincides with the objective pattern within a predetermined precision in the memory device 304 to complete learning (step S26→step S28). Then, the recollection processing of the computer 302 will be explained.

When the mode switch 303 instructs the recollection mode and pattern information, i.e., source pattern signals I1 and I2 to be recollected are inputted to the computer 302 through the interface 301, the computer 302 performs the control procedures shown in FIG. 12.

In FIG. 12, the computer 302 memorizes the inputted pattern information in an internal resistor and then outputs the transfer efficiency and the bias stored in the memory device 304 (step S31→step S32). Thereafter, the computer 302 performs the first error correction calculation using these transfer efficiency, bias and level value of the input pattern (step S25). The procedures of this error correction calculation are identical with those in the step S25 shown in FIG. 11 and, therefore, details thereof are omitted.

When the result (output pattern) of the error correction calculation is obtained, the host computer 302 performs feedback calculation for the second error correction utilizing the calculated results as an input pattern (step S24→step S25).

Next, the computer judges whether or not the result of the first calculation and that of the second calculation coincide with one another within a predetermined precision (step S36). When there is no correspondency between the foregoing two calculated results, the computer judges that the calculated result does not converge. The procedure returns to the step S34 and the third calculation is performed (step S36→step S34→step S35→step S36).

Then, the feedback calculation for error correction is repeated until the calculated result of this time and that of the last time coincide with each other, in other words the calculated result converges.

If the computer 302 detects the convergence of the calculated result (step S36), the calculated result is, at this time, outputted as the output pattern through the interface 305 (step S28).

As has been explained above, the present embodiment is designed such that the error correction calculation is performed by a computer. Therefore, the construction of the association system is simplified and hence a complicated wiring operation for producing such a system can be eliminated.

In the calculation of an output element for error correction in the present embodiment, a sigmoid function is used. But, it is also possible to use logistic function or other differential functions. In this connection, the use of a sigmoid function is most preferred because the processing time of a computer can be reduced.

The present invention has been described in detail with respect to preferred embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. A pattern associative memory method for associating and storing patterns comprising the steps of:

inputting a set of pattern signals to be learned to a group of input elements of an error correcting circuit having one group of input elements for inputting information signals, one group of output elements including the same number of elements as the number of said input elements and each having predetermined signal level conversion characteristics and a plurality of wirings arranged in the form of a neural network and for connecting said one group of input elements to said one group of output elements;

storing a pattern shown by the inputted pattern signals in said error correcting circuit while variably setting each transfer efficiency of said plurality of wirings, by using a backpropagation method so that the inputted pattern signals and a set of output signals outputted from said group of output elements have substantially the same level;

inputting at least one set of pattern signals as the basis of a recollection of said group of input elements under a condition having the same transfer efficiency as the set transfer efficiency when the recollection is performed;

feedback-inputting said set of output signals outputted from said group of output elements to said group of input elements; and outputting a set of the outputted signals in a converged condition as a result of recollection of said set of pattern signals as the basis of the recollection.

2. A pattern associative memory method as claimed in claim 1, further comprising the step of variably setting a bias value of each signal level conversion characteristics of said group output elements simultaneously with said setting of the value of the transfer efficiency.

3. A pattern associative memory system comprising:

means for correcting errors, said means having a group of input elements for inputting a set of pattern signals as the basis of recollection, a group of output elements having the same number of elements as the number of said group of the input elements and each having predetermined signal level conversion characteristics and a plurality of wirings arranged in the form of a neural network and for connecting said group of input elements to said group of output elements wherein at least one set of pattern signals used as the results of recollection is stored in advance in accordance with a value of transfer efficiency of said plurality of wirings and a level of said at least one set of pattern signals as the basis of the recollection is made close to a level of a pattern signal which is most similar among said at least one set of pattern signals; and feedback signal lines for feedback-inputting said set of output signals outputted from said group of the output elements in said means for correcting errors to said group of input elements.

4. A pattern associative memory system as claimed in claim 3, wherein said means for correcting errors further includes at least one group of hidden elements which have predetermined signal level conversion characteristics and which are disposed between said group of input elements and said group of output elements; and said group of input elements, said group of output elements, and said hidden elements are connected to each other in the form of a neural network.

5. A pattern associative memory system as claimed in claim 3, further comprising an instructing means for selectively instructing either a learning and memory mode or a recollection mode; and a signal line switching means for inputting a set of pattern signals to be learned to said group of input elements and interrupting the connection between said feedback signal lines and said group of input elements when said learning and memory mode is instructed by said instructing means, and for inputting said set of pattern signals as the basis of recollection to said group of input elements to connect said feedback signal lines to said group of input elements when said recollection mode is instructed by said instructing means.

6. A pattern associative memory system as claimed in claim 5, further comprising a memory condition establishing means for establishing a value of said transfer efficiency of said plurality of wirings as a memory condition in said learning mode, so that a level of said set pattern of signals as the basis of recollection which is inputted to said group of input elements and a level of said set of pattern signals outputted from said group of output elements are substantially identical with one another.

7. A pattern associative memory system as claimed in claim 6, wherein said memory condition establishing means establishes a correction value of said transfer efficiency in accordance with the backpropagation method.

8. A pattern associative memory system as claimed in claim 3, further comprising means for judging whether a level of said set of output signals outputted from said group of output elements of said means for correcting errors is changed or not; and a display means for displaying a message that a recollection process is completed when said judging means outputs a negative judgment.

* * * * *